(12) United States Patent
Tracht et al.

(10) Patent No.: US 7,380,812 B2
(45) Date of Patent: Jun. 3, 2008

(54) VEHICLE SEAT ASSEMBLY WITH INFLATABLE AIR BAG

(75) Inventors: Michael L. Tracht, Ingolstadt (DE); Richard G. Dierl, Sandersdoft (DE)

(73) Assignee: Lear Corporation, Southfield, MI (US)

(*) Notice: Subject to any disclaimer, the term of this patent is extended or adjusted under 35 U.S.C. 154(b) by 323 days.

(21) Appl. No.: 10/904,853

(22) Filed: Dec. 1, 2004

(65) Prior Publication Data

US 2006/0113768 A1 Jun. 1, 2006

(51) Int. Cl.
*B60R 21/20* (2006.01)
(52) U.S. Cl. .................. 280/728.3; 280/730.2
(58) Field of Classification Search ............. 280/728.2, 280/728.3, 730.1, 730.2, 732
See application file for complete search history.

(56) References Cited

U.S. PATENT DOCUMENTS

| | | | |
|---|---|---|---|
| 5,498,030 A | 3/1996 | Hill et al. | |
| 5,645,295 A | 7/1997 | White, Jr. et al. | |
| 5,678,853 A | 10/1997 | Maly | |
| 5,749,597 A | 5/1998 | Saderholm | |
| 5,762,363 A | 6/1998 | Brown et al. | |
| 5,810,389 A | 9/1998 | Yamaji et al. | |
| 5,816,610 A | 10/1998 | Higashiura et al. | |
| 5,860,673 A | 1/1999 | Hasegawa et al. | |
| 5,863,063 A | 1/1999 | Harrell | |
| 5,899,528 A | 5/1999 | Rumpf et al. | |
| 5,927,749 A | 7/1999 | Homier et al. | |
| 5,938,232 A | 8/1999 | Kalandek et al. | |
| 5,967,603 A | 10/1999 | Genders et al. | |
| 6,045,151 A | 4/2000 | Wu | |
| 6,050,636 A | 4/2000 | Chevallier et al. | |
| 6,206,410 B1* | 3/2001 | Brown | 280/728.3 |
| 6,237,934 B1 | 5/2001 | Harrell et al. | |
| 6,352,304 B1* | 3/2002 | Sorgenfrei | 297/216.13 |
| 6,588,838 B1 | 7/2003 | Dick, Jr. et al. | |
| 7,134,685 B2* | 11/2006 | Panagos et al. | 280/730.2 |
| 2006/0113752 A1* | 6/2006 | Tracht | 280/728.2 |
| 2006/0113761 A1* | 6/2006 | Tracht | 280/730.2 |
| 2006/0113767 A1 | 6/2006 | Tracht | |
| 2006/0113769 A1* | 6/2006 | Tracht | 280/730.2 |

FOREIGN PATENT DOCUMENTS

| | | |
|---|---|---|
| DE | 10307480 | 9/2004 |
| DE | 103 40 508 A1 | 3/2005 |
| EP | 0819587 | 1/1999 |
| FR | 2 806 685 A1 | 9/2001 |

OTHER PUBLICATIONS

U.S. Appl. No. 08/808,572, filed Feb. 28, 1997, Wu et al.

(Continued)

*Primary Examiner*—Toan C. To
(74) *Attorney, Agent, or Firm*—Brooks Kushman P.C.

(57) ABSTRACT

A vehicle seat assembly includes an air bag arrangement having an inflatable air bag, and a cover material overlaying the air bag arrangement. The cover material has first and second sections that define a seam through with the air bag is deployable. A retainer is connected to the first and second sections of the cover material, and the retainer has a frangible portion. Upon inflation of the air bag, the retainer is configured to separate proximate the frangible portion to allow the air bag to deploy between the first and second sections of the cover material.

20 Claims, 3 Drawing Sheets

OTHER PUBLICATIONS

Notice of Allowance, mailed Jun. 6, 2007 for U.S. Appl. No. 10/904,854, filed Dec. 1, 2004, Inventor: Michael L. Tracht, Publication No. 2006/0113769A1.

Notice of Allowance, mailed Jun. 15, 2007 for U.S. Appl. No. 10/904,852, filed Dec. 1, 2004, Inventor Michael L. Tracht, Publication No. 2006/0113767A1.

* cited by examiner

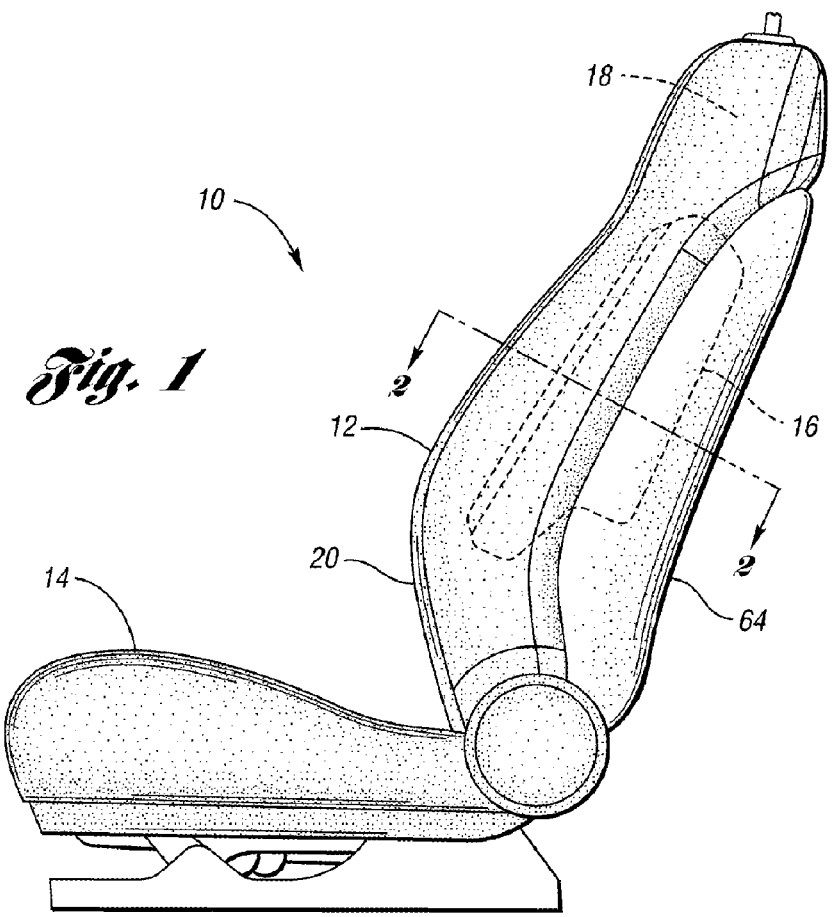
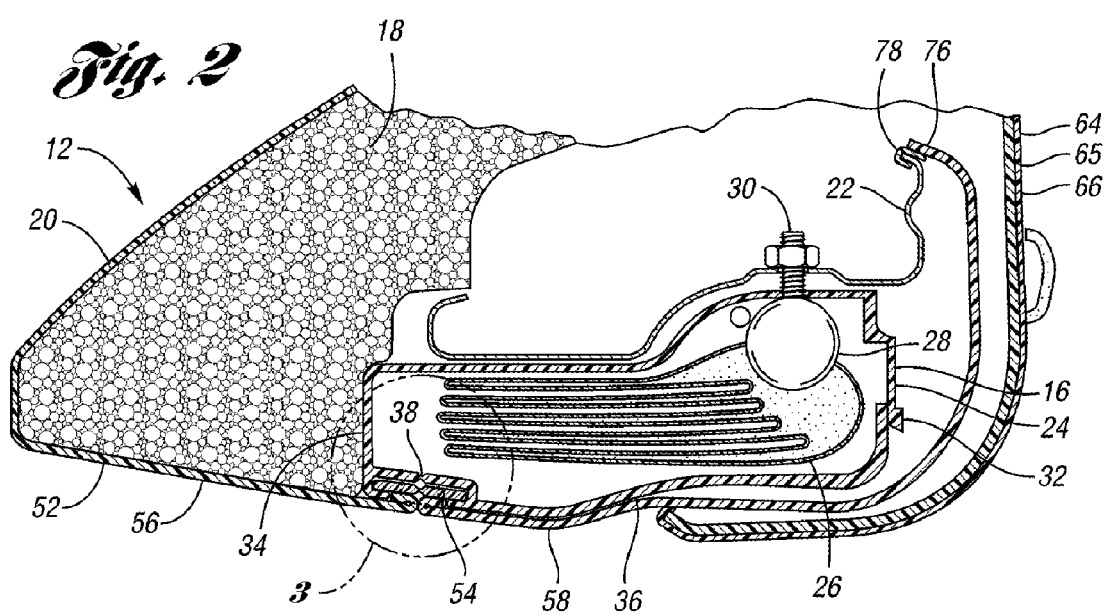

VEHICLE SEAT ASSEMBLY WITH INFLATABLE AIR BAG

BACKGROUND OF THE INVENTION

1. Field of the Invention

The invention relates to a vehicle seat assembly having an inflatable air bag.

2. Background Art

Vehicle seat assemblies may be provided with inflatable air bags. U.S. Pat. Nos. 6,045,151 and 6,237,934 disclose examples of such vehicle seat assemblies.

SUMMARY OF THE INVENTION

Under the invention, a vehicle seat assembly is provided. In one embodiment, the assembly includes an inflatable air bag and a housing associated with the air bag and having first and second housing portions. The assembly further includes a cover material overlaying the housing, and the cover material has first and second sections. A retainer is connected to the housing and the first and second sections of the cover material. Furthermore, the retainer has a frangible portion. Upon inflation of the air bag, the housing portions are configured to move away from each other, and the retainer is configured to separate proximate the frangible portion to allow the air bag to deploy between the first and second sections of the cover material.

In another embodiment, the assembly includes an air bag arrangement having an inflatable air bag, and a cover material overlaying the air bag arrangement. The cover material has first and second sections that define a seam through with the air bag is deployable. A retainer is connected to the first and second sections of the cover material, and the retainer has a frangible portion. Upon inflation of the air bag, the retainer is configured to separate proximate the frangible portion to allow the air bag to deploy between the first and second sections of the cover material.

Further under the invention, a method of manufacturing a vehicle seat assembly is provided. The method may include the steps of attaching an air bag arrangement to a seat frame, the air bag arrangement including an inflatable air bag and a housing associated with the air bag, the housing including first and second housing portions; positioning a cover arrangement over the air bag arrangement after the attaching step, the cover arrangement including a cover material having first and second sections, and a retainer connected to the first and second sections, the retainer having a frangible portion that is configured to break upon inflation of the air bag to allow the air bag to deploy between the first and second sections; and connecting the retainer to the housing portions.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a side view of a vehicle seat assembly according to the invention and including an air bag module positioned in a seat back cushion assembly;

FIG. 2 is a fragmentary cross-sectional view of the seat back cushion assembly taken along line 2-2 of FIG. 1 and showing a housing of the air bag module connected to first and second sections of a cover material with a retainer;

DETAILED DESCRIPTION OF THE PREFERRED EMBODIMENT(S)

Figure 3:
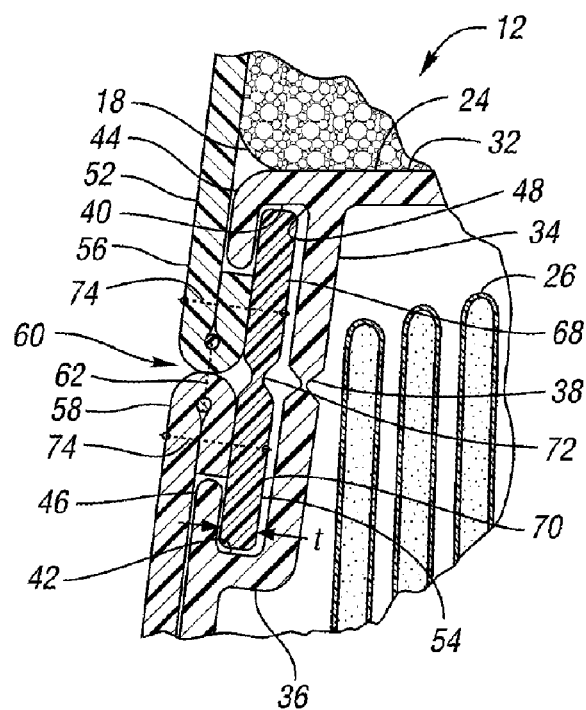
FIG. 3 is an enlarged view of a portion of FIG. 2 showing the connection between the housing and the cover material.

FIG. 1 shows a vehicle seat assembly 10 according to the invention for use in a motor vehicle. The seat assembly 10 includes a seat back cushion assembly 12 and a seat bottom cushion assembly 14 attached to the seat back cushion assembly 12. The seat back cushion assembly 12 includes an air bag arrangement or assembly, such as an air bag module 16, a seat cushion or pad 18 overlaying the air bag module 16, and a cover arrangement 20 overlaying the seat pad 18 and air bag module 16.

As shown in FIG. 2, the air bag module 16 may be disposed proximate one side of the seat back cushion assembly 12, such as an outboard lateral side or an inboard lateral side, and may be connected to a support member, such as seat back frame 22. Alternatively, the air bag module 16 may be located in any suitable position on the seat back cushion assembly 12 or seat bottom cushion assembly 14. Furthermore, the seat back cushion assembly 12 and seat bottom cushion assembly 14 may each be provided with multiple air bag modules 16, such as outboard and inboard air bag modules 16 that each have a similar configuration and function as described below in detail.

Still referring to FIG. 2, the air bag module 16 includes a housing 24 that may substantially surround an inflatable air bag 26, and an inflator 28 connected to the air bag 26 for inflating the air bag 26. The inflator 28 may be connected to the frame 22, or other suitable support member, in any suitable manner, such as with one or more fasteners 30. The fasteners 30, which may each include a bolt and nut for example, may also be used to connect the housing 24 to the frame 22. Alternatively, the air bag module 16 may be connected to the frame 22, or other suitable support member, in any suitable manner.

The housing 24 has a body 32, such as a clam-shell body, that may comprise a relatively rigid molded plastic material, such as polypropylene. Alternatively, the body 32 may be made of any suitable material and in any suitable manner. Furthermore, the body 32 has first and second housing portions 34 and 36, respectively, that are moveable away from each other upon inflation of the air bag 26.

In the embodiment shown in FIGS. 2 and 3, the housing portions 34 and 36 are joined together by a rupturable portion or weakened area, such as a frangible groove or seam 38, that is configured to rupture upon inflation of the air bag 26. Alternatively, ends of the housing portions 34 and 36 may be spaced apart from each other to define a deployment opening. Furthermore, if desired, the housing portions 34 and 36 may joined together in any suitable manner, such as with one or more temporary or breakable fasteners.

As further shown in FIG. 3, the first and second housing portions 34 and 36 may have first and second receptacles 40 and 42, respectively. In the embodiment shown in FIG. 3, the first and second receptacles 40 and 42, respectively, are defined by first and second projections 44 and 46, respectively. Furthermore, the receptacles 40 and 42 cooperate to define a longitudinally extending channel 48.

Referring to FIGS. 2 and 3, the seat pad 18 may be disposed adjacent the air bag module 16 and the frame 22. In at least one embodiment, the seat pad 18 is made from a molded polymeric material, such as a polyurethane foam. The use of a polymeric foam material to construct the seat pad 18 can be cost effective and can provide the flexibility needed to easily change the shape of the seat pad 18 for different vehicle seat configurations. Alternatively, the seat pad 18 may comprise any suitable material, and may be made in any suitable manner.

The cover arrangement 20 includes a cover material or trim cover 52 and a retainer 54 attached to the trim cover 52. The trim cover 52 may be made of any suitable material, such as cloth, vinyl or leather, and may be provided with or without a padding layer. Furthermore, the trim cover 52 may include multiple pieces that are joined together at seams. Referring to FIGS. 2 and 3, the trim cover 52 includes first and second sections 56 and 58, respectively, that cooperate to define a seam 60 through which the air bag 26 may deploy. For example, the sections 56 and 58 may be connected together such as with sewn stitching 62, as shown in FIG. 3. Alternatively, ends of the first and second sections 56 and 58, respectively, may not be directly connected together, but merely abut each other to define the seam 60.

As is shown in FIGS. 1 and 2, in at least some embodiments, a relatively rigid panel 64 may also be provided in the rear area of the seat back cushion assembly 12 to provide support and/or for aesthetics. The panel 64 may include a main body 65, such as a plastic molding. In addition, the panel 64 may include a cover layer 66 made of any suitable material, such as cloth, leather or vinyl, attached to the main body 65.

The retainer 54 includes first and second retainer portions 68 and 70, respectively, that are joined together by a frangible portion 72 that is configured to rupture or otherwise break upon deployment of the air bag 26. For example, the frangible portion 72 may include a reduced thickness area, as shown in FIGS. 2 and 3, and/or multiple perforations that result in a weakened area compared to the adjacent retainer portions 68 and 70. As another example, the frangible portion 72 may be made of a weaker material relative to that of retainer portions 68 and 70.

Furthermore, the first and second retainer portions 68 and 70, respectively, are connected in any suitable manner to the first and second sections 56 and 58, respectively, of the trim cover 52. For example, the retainer portions 68 and 70 may be sewn, tacked, glued, or sonically welded to the sections 56 and 58. In the embodiment shown in FIG. 3, for example, the retainer portions 68 and 70 are sewn to the trim cover sections 56 and 58 with stitching 74.

The first and second retainer portions 56 and 58, respectively, are disposable in the first and second receptacles 40 and 42, respectively, to connect the trim cover 52 to the housing 24. In the embodiment shown in FIG. 3, for example, the retainer 54 is configured to be slid into the channel 48 defined by the receptacles 40 and 42.

Figure 4:
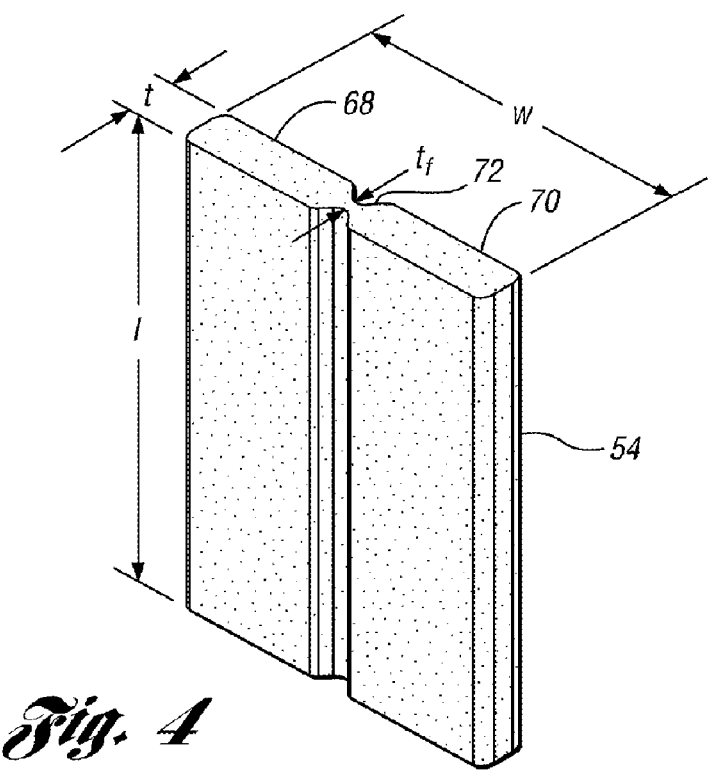
FIG. 4 is a perspective view of the retainer.

While the retainer 54 may have any suitable configuration, referring to the embodiment shown in FIG. 4, the retainer 54 may have a length l in the range of 25 to 500 millimeters (mm), and a width w in the range of 25 to 150 mm. Furthermore, the retainer portions 68 and 70 may each have a general thickness t in the range of 0.5 to 5 mm. In embodiments where the frangible portion 72 comprises a section having a reduced thickness relative to the retainer portions 68 and 70, the frangible portion 72 may have a minimum general thickness $t_f$ in the range of 0.05 to 0.4 mm.

The retainer 54 may comprise any suitable material and may be made in any suitable manner. For example, the retainer 54 may be made of relatively rigid plastic, such as nylon, polypropylene, or polyethylene, that is molded or extruded into a desired shape. Furthermore, the retainer 54 may be formed as a single piece.

With the configuration described above, the retainer 54 may extend substantially the entire length of the housing 24, or along any portion of the length of the housing 24. Furthermore, multiple retainers that are the same or similar to the retainer 54 may be used to connect the trim cover 52 to the housing 24.

Referring to FIGS. 1 through 3, an exemplary method of assembling the vehicle seat assembly 10 will now be described. First, the air bag module 16 may be connected to the frame 22 with the fasteners 30. Next, the seat pad 18 may positioned about the air bag module 16 and frame 22, and attached to the air bag module 16 and/or frame 22. The trim cover 52 with the retainer 54 already attached thereto may then be placed over the seat pad 18, and the retainer 54 may be slid in a longitudinal direction into the channel 48. Next, a free end 76 of the trim cover section 58 may be connected to the frame 22 in any suitable manner, such as with a clip 78. The panel 64 may then be attached to the frame 22, or other suitable support member, in any suitable manner.

When the air bag 26 is inflated by the inflator 28, the air bag 26 causes the frangible seam 38 to break, and further causes the first and second housing portions 34 and 36, respectively, to move away from each other. Continued inflation of the air bag 26 causes the frangible portion 72 of the retainer 54 to rupture, and also causes the seam 60 to rupture if the trim cover sections 56 and 58 are connected together at the seam 60, thereby allowing the air bag 26 to deploy between the sections 56 and 58 of the trim cover 52.

The retainer 54 may function to facilitate deployment of the air bag 26 in one or more ways. For example, use of the retainer 54 may ensure proper alignment between the air bag module 16 and the seam 60. As another example, the retainer 54 can be manufactured to consistently provide a break strength for the frangible portion 72 that is within a desired break strength range. As a result, use of retainer 54 can help ensure relatively consistent air bag deployment. In that regard, if the trim cover sections 56 and 58 are directly connected together at seam 60, the break strength of such connection may be configured to be relatively small compared to the break strength of the frangible portion 72.

Figure 5:
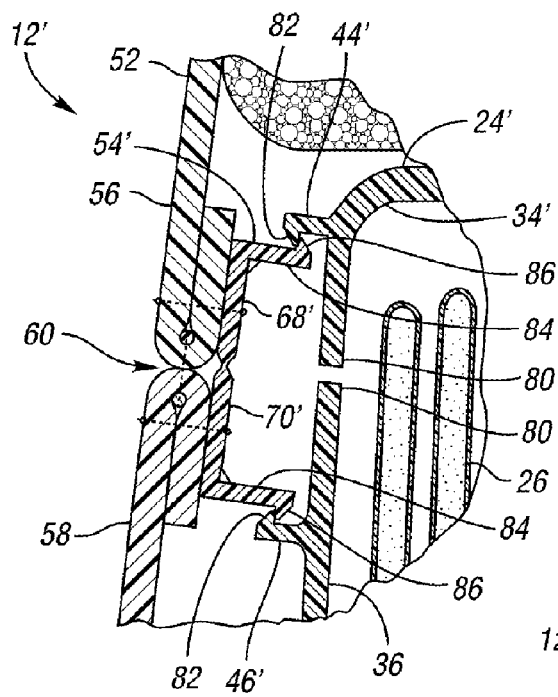
FIG. 5 is an enlarged view similar to FIG. 3 of a second embodiment of the seat back cushion assembly.
Figure 6:
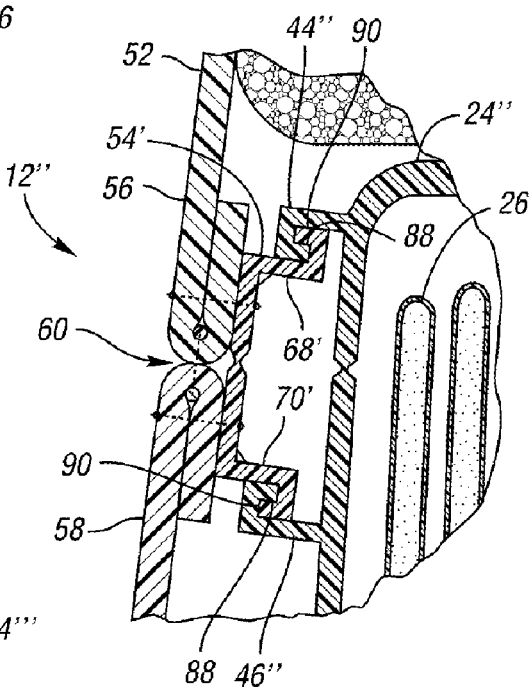
FIG. 6 is an enlarged view similar to FIG. 3 of a third embodiment of the seat back cushion assembly.
Figure 7:
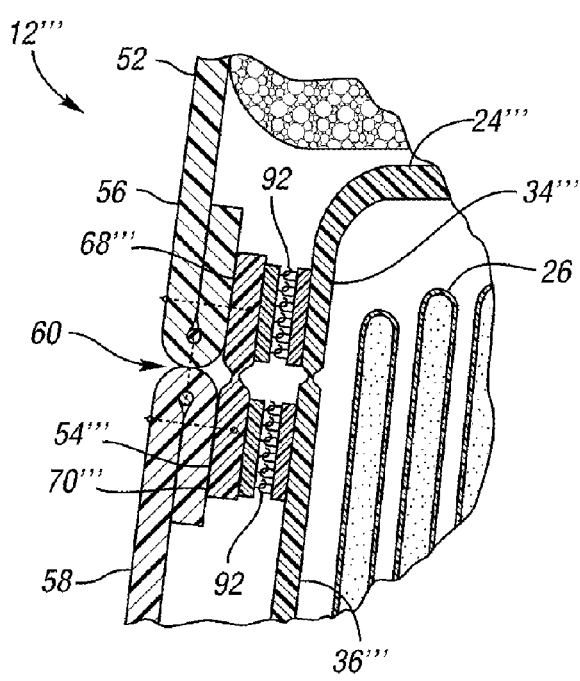
FIG. 7 is an enlarged view similar to FIG. 3 of a fourth embodiment of the seat back cushion assembly.

Referring to FIGS. 5-7, some example alternative air bag housing and retainer configurations are shown for additional embodiments 12', 12" and 12''' of the seat back cushion assembly. In the embodiment 12' shown in FIG. 5, housing 24' includes first and second housing portions 34' and 36', respectively, that have ends 80 spaced apart from each other to define a deployment opening. In addition, first and second projections 44' and 46', respectively, of the first and second housing portions 34' and 36', respectively, each have a beveled end 82.

Retainer 54' shown in FIG. 5 includes first and second retainer portions 68' and 70', respectively, that each have a leg 84 having a beveled end 86. The beveled ends 86 are engageable with the beveled ends 82 of the housing 24' to facilitate a snap-fit engagement between the retainer 54' and the housing 24'. The legs 84 may also function to space the trim cover 52 away from the housing 24' proximate the seam 60.

In the embodiment 12" shown in FIG. 6, housing 24" and retainer 54" are configured to provide an interlocking engagement between each other, such that retainer portions 68" and 70" may remain attached to the housing 24" during deployment of the air bag 26. More specifically, projections 44" and 46" of the housing 24" each define a groove 88 that is configured to slidably receive an end 90 of a respective retainer portion 68", 70".

In the embodiment 12''' shown in FIG. 7, housing 24''' and retainer 54''' are connected together with hook and loop fasteners 92. Specifically, each housing portion 34''' and 36''' of housing 24''' includes one portion of a respective hook and loop fastener 92, and each retainer portion 68''' and 70''' includes the other portion of the respective hook and loop fastener 92.

While exemplary embodiments in accordance with the invention are illustrated and disclosed, such disclosure should not be construed to limit the claims. It is anticipated that various modifications and alternative designs may be made without departing from the scope of the invention. For example, a retainer according to the invention may be attached to a respective air bag housing in any suitable manner. As another example, a vehicle seat assembly according to the invention may be provided with a retainer that is attached to a trim cover, but that is not attached to an air bag housing. Furthermore, any of the features described above may be selectively combined with any of the above described embodiments.

What is claimed is:

1. A vehicle seat assembly comprising:
   an inflatable air bag;
   a housing associated with the air bag, the housing having first and second housing portions;
   a cover material overlaying the housing, the cover material having first and second sections; and
   a retainer connected to the housing and the first and second sections of the cover material such that the retainer joins the cover material to the housing, the retainer having a frangible portion and being formed separately from the housing;
   wherein upon inflation of the air bag, the housing portions are configured to allow relative movement therebetween, and the retainer is configured to separate proximate the frangible portion to allow the air bag to deploy between the first and second sections of the cover material.

2. The assembly of claim 1 wherein the first and second housing portions have first and second receptacles, respectively, and the retainer is disposed in the first and second receptacles.

3. The assembly of claim 2 wherein the retainer has first and second beveled ends, and the first and second housing portions have first and second beveled surfaces, respectively, that are engageable with the first and second beveled ends, respectively, of the retainer to facilitate a snap-fit engagement with the retainer.

4. The assembly of claim 2 wherein the first and second receptacles define first and second grooves, respectively, that interlockingly receive first and second ends, respectively, of the retainer, such that the retainer is configured to remain attached to the housing during deployment of the air bag.

5. The assembly of claim 4 wherein the retainer has first and second generally L-shaped legs that define the first and second ends, respectively, that are slidably received in the first and second grooves, respectively.

6. The assembly of claim 1 wherein the retainer is connected to the housing with a hook and loop fastener.

7. The assembly of claim 1 wherein the first and second housing portions are connected together at a weakened area that is configured to rupture upon deployment of the air bag.

8. The assembly of claim 1 wherein ends of the housing portions are spaced apart to define a deployment opening for the air bag.

9. The assembly of claim 1 wherein the first and second sections of the cover material are connected together at a seam through which the air bag is deployable.

10. The assembly of claim 1 wherein the retainer comprises plastic.

11. The assembly of claim 1 wherein the retainer is sewn to the first and second sections of the cover material.

12. The assembly of claim 1 wherein the sections of the cover material cooperate to define a deployment seam, and wherein the cover material is spaced away from the housing proximate the deployment seam.

13. A vehicle seat assembly comprising:
   an air bag arrangement having an inflatable air bag;
   a cover material overlaying the air bag arrangement, the cover material having first and second sections that define a seam through with the air bag is deployable; and
   a relatively rigid, plastic retainer sewn to the first and second sections of the cover material, the retainer having a frangible portion;
   wherein upon inflation of the air bag, the retainer is configured to separate proximate the frangible portion to allow the air bag to deploy between the first and second sections of the cover material.

14. The assembly of claim 13 wherein the air bag arrangement includes a housing associated with the air bag, and wherein the retainer is connected to the housing.

15. The assembly of claim 13 wherein the frangible portion of the retainer is generally aligned with the seam of the cover material.

16. A method of manufacturing a vehicle seat assembly, the method comprising:
   attaching an air bag arrangement to a seat frame, the air bag arrangement including an inflatable air bag and a housing associated with the air bag, the housing including first and second housing portions;
   positioning a cover arrangement over the air bag arrangement after the attaching step, the cover arrangement including a cover material having first and second sections, and a retainer connected to the first and second sections, the retainer having a frangible portion that is configured to break upon inflation of the air bag to allow the air bag to deploy between the first and second sections; and
   connecting the retainer to the housing portions.

17. The method of claim 16 wherein the first and second housing portions have first and second receptacles, respectively, and wherein the connecting step includes inserting first and second portions of the retainer into the first and second receptacles, respectively.

18. The method of claim 16 wherein the housing portions define a channel, and wherein the connecting step includes sliding the retainer along the channel to connect the retainer to the housing portions.

19. The method of claim 16 wherein the first and second housing portions have first and second receptacles, respectively, and the retainer has first and second legs, and the connecting step comprises snap-fitting the first and second legs into the first and second receptacles, respectively.

20. The method of claim 19 wherein the first and second legs each have a beveled end, and the first and second housing portions each have a beveled surface, and wherein the beveled surfaces are engageable with the beveled ends during the connecting step to facilitate snap-fitting the first and second legs into the first and second receptacles, respectively.

* * * * *

UNITED STATES PATENT AND TRADEMARK OFFICE
CERTIFICATE OF CORRECTION

PATENT NO.        : 7,380,812 B2
APPLICATION NO.   : 10/904853
DATED             : June 3, 2008
INVENTOR(S)       : Michael L. Tracht and Richard G. Dierl It is certified that error appears in the above-identified patent and that said Letters Patent is hereby corrected as shown below:

Column 6, line 23, claim 13:    Delete "with" and insert --which-- therefor.

Signed and Sealed this

Sixteenth Day of September, 2008

JON W. DUDAS
*Director of the United States Patent and Trademark Office*